(12) United States Patent
Coonrod

(10) Patent No.: US 11,271,945 B2
(45) Date of Patent: Mar. 8, 2022

(54) LOCALIZED ACCESS CONTROL FOR AUTHORIZED MODIFICATIONS OF DATA USING A CRYPTOGRAPHIC HASH

(71) Applicant: FogChain Inc., San Carlos, CA (US)

(72) Inventor: Nathanael Phillip Coonrod, Gilbert, AZ (US)

(73) Assignee: Prometheus8, San Carlos, CA (US)

( * ) Notice: Subject to any disclaimer, the term of this patent is extended or adjusted under 35 U.S.C. 154(b) by 247 days.

(21) Appl. No.: 16/560,804

(22) Filed: Sep. 4, 2019

(65) Prior Publication Data

US 2020/0076823 A1 Mar. 5, 2020

Related U.S. Application Data

(60) Provisional application No. 62/727,434, filed on Sep. 5, 2018.

(51) Int. Cl.
*H04L 29/06* (2006.01)
*H04W 12/63* (2021.01)
*H04W 12/086* (2021.01)
*H04W 12/71* (2021.01)

(52) U.S. Cl.
CPC ......... *H04L 63/107* (2013.01); *H04W 12/086* (2021.01); *H04W 12/63* (2021.01); *H04W 12/71* (2021.01)

(58) Field of Classification Search
CPC ... H04L 63/107; H04L 63/104; H04L 9/3239; H04L 2209/38; H04W 12/63; H04W 12/71; H04W 12/086
See application file for complete search history.

(56) References Cited

U.S. PATENT DOCUMENTS

2019/0268319 A1* 8/2019 Kurian .................. H04L 63/083
2020/0162546 A1* 5/2020 Juhlin ................. H04L 67/1044

* cited by examiner

*Primary Examiner* — Nelson S. Giddins
(74) *Attorney, Agent, or Firm* — Knobbe, Martens, Olson & Bear, LLP

(57) ABSTRACT

Embodiments of network devices for access control are described. In some embodiments, an access control processor of a first node receives a request packet from a requestor node on an unsecured network to join a group of nodes; assigns, using a secured network protocol through the network interface, the requestor node to a first localized pool of the group of nodes within the secured network based on the received location information associated with the requestor node, wherein one or more nodes of the first localized pool are configured to perform one or more authorized modifications of data, the data comprising a blockchain including at least one cryptographic hash configured to protect the data against unauthorized modifications; and initiates the one or more first authorized modifications of the data using one or more nodes assigned to the first localized pool including the requestor node.

17 Claims, 9 Drawing Sheets

LOCALIZED ACCESS CONTROL FOR AUTHORIZED MODIFICATIONS OF DATA USING A CRYPTOGRAPHIC HASH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present disclosure relates to data access control, and more particularly, to authorized modifications of data based on the data access control.

Description of the Related Art

Technological advances in blockchain technology and other distributed ledger technology have allowed for digital information to be securely distributed using secured cryptography. As blockchain technology continues to improve, transactions and other data modifications can occur more securely and quickly across millions of users. Blockchain technology strives to allow the data to be transparent and incorruptible without a singular point of failure or a centralized single controlling entity.

BRIEF DESCRIPTION OF THE DRAWINGS

The innovations described in the claims each have several aspects, no single one of which is solely responsible for its desirable attributes. Without limiting the scope of the claims, some prominent features of this disclosure will now be briefly described.

SUMMARY

Figure 1:
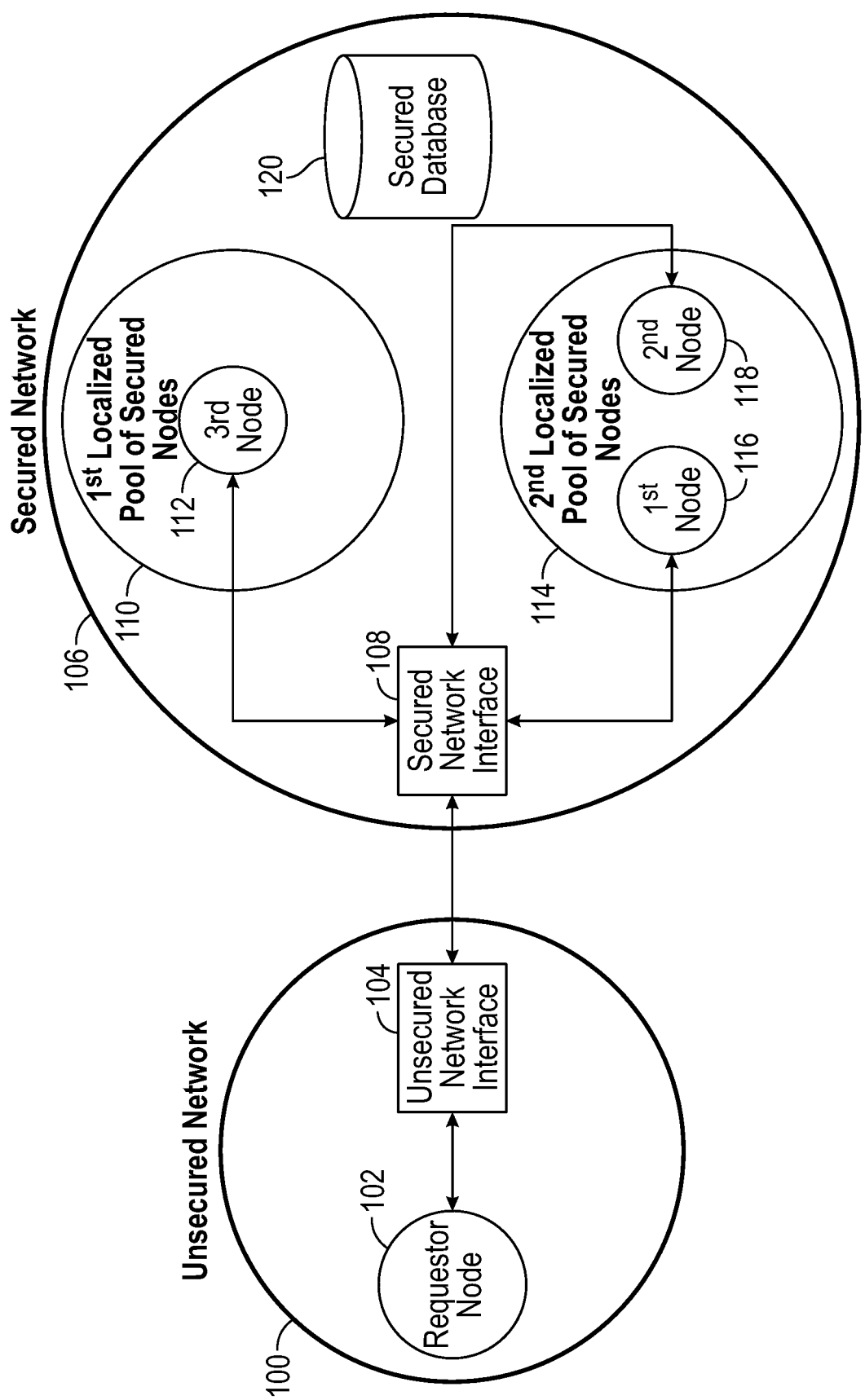
FIG. 1 is a block diagram illustrating an unsecured and secured network infrastructure according to some embodiments of the present disclosure

Some embodiments include a data access control method comprising: by at least one processor of a first node: via a network interface, receiving a request packet from a requestor node on an unsecured network to join a group of nodes in a secured network, the first node configured to monitor data shared in the group of nodes comprising a plurality of partitioned nodes of the secured network; in response to the received request, receiving location or locational information associated with the requestor node; determining that a location of the requestor node is within an area of coverage for a first localized pool of the group of nodes within the secured network based on the received locational information associated with the requestor node; assigning, using a secured network protocol through the network interface, the requestor node to the first localized pool, wherein one or more nodes of the first localized pool are configured to perform one or more authorized modifications of data, the data comprising a blockchain including at least one cryptographic hash configured to protect the data against unauthorized modifications; initiating one or more first authorized modifications of a first subset of the data using one or more nodes assigned to the first localized pool including the requestor node; and initiating one or more second authorized modifications of a second subset of the data using one or more nodes assigned to the first localized pool including the requestor node and one or more nodes of a second localized pool of the group of nodes, wherein the one or more nodes of the second pool are different than the one or more nodes of the first pool.

The method of any of the preceding paragraphs can further comprise: partitioning nodes of the secured network into a plurality of localized pools of secured nodes based on location information, the plurality of localized pools of secured nodes including the first and second pool.

The method of any of the preceding paragraphs can further comprise: wherein the one or more first authorized modifications comprise modifying data located in the location corresponding to the locational information.

The method of any of the preceding paragraphs can further comprise: wherein the one or more first authorized modifications comprise transmitting data packets between the first node and a remote device.

The method of any of the preceding paragraphs can further comprise: wherein the one or more first authorized modifications occur in response to signal from a cellular base station in communication with the remote device, and wherein the one or more first authorized modifications include disconnecting the remote device from the cellular base station.

The method of any of the preceding paragraphs can further comprise: wherein the one or more first authorized modifications occur in response to meeting a threshold of network traffic for a cellular base station.

The method of any of the preceding paragraphs can further comprise: wherein the locational information include at least one of: global positioning system address, global system for mobile address, user inputted address, physical address, IP address, Wi-Fi signal address, MAC address, base tower address, location history, or a current location for the first node.

The method of any of the preceding paragraphs can further comprise: wherein initiating the one or more first authorized modifications includes assigning a first processing core to perform the one or more first authorized modifications, and wherein initiating the one or more second authorized modifications of the data includes assigning a second processing core to perform the one or more second authorized modifications.

The method of any of the preceding paragraphs can further comprise: wherein initiating the one or more first authorized modifications includes retrieving data files stored external to the area of coverage for the first localized pool of the group of nodes.

The method of any of the preceding paragraphs can further comprise: wherein initiating the one or more first authorized modifications includes transmitting and receiving network traffic on behalf of a remote device.

The method of any of the preceding paragraphs can further comprise: wherein initiating the one or more first authorized modifications includes creating a wireless internet service for a remote device located in the area of coverage for the first localized pool of the group of nodes.

Some embodiments include an a data access control system comprising: at least one processor of a first node configured to: via a network interface, receive a request packet from a requestor node on an unsecured network to join a group of nodes in a secured network, the first node configured to monitor data shared in the group of nodes comprising a plurality of partitioned nodes of the secured network; in response to the received request, receive locational information associated with the requestor node; determine that a location of the requestor node is within an area of coverage for a first localized pool of the group of nodes within the secured network based on the received locational information associated with the requestor node; assign, using a secured network protocol through the network interface, the requestor node to the first localized pool, wherein one or more nodes of the first localized pool are configured to perform one or more authorized modifications of data, the data comprising a blockchain including at least one cryptographic hash configured to protect the data against unauthorized modifications; initiate one or more first authorized modifications of a first subset of the data using one or more nodes assigned to the first localized pool including the requestor node; and initiate one or more second authorized modifications of a second subset of the data using one or more nodes assigned to the first localized pool including the requestor node and one or more nodes of a second localized pool of the group of nodes, wherein the one or more nodes of the second pool are different than the one or more nodes of the first pool.

The system of any of the preceding paragraphs can further comprise: wherein the at least one processor is further configured to: partition nodes of the secured network into a plurality of localized pools of secured nodes based on location information, the plurality of localized pools of secured nodes including the first and second pool.

The system of any of the preceding paragraphs can further comprise: wherein the one or more first authorized modifications comprise modifying data located in the location corresponding to the locational information.

The system of any of the preceding paragraphs can further comprise: wherein the one or more first authorized modifications comprise transmitting data packets between the first node and a remote device.

The system of any of the preceding paragraphs can further comprise: wherein the one or more first authorized modifications occur in response to signal from a cellular base station in communication with the remote device, and wherein the one or more first authorized modifications include disconnecting the remote device from the cellular base station.

The system of any of the preceding paragraphs can further comprise: wherein the one or more first authorized modifications occur in response to meeting a threshold of network traffic for a cellular base station.

The system of any of the preceding paragraphs can further comprise: wherein the locational information include at least one of: global positioning system address, global system for mobile address, user inputted address, physical address, IP address, Wi-Fi signal address, MAC address, base tower address, location history, or a current location for the first node.

The system of any of the preceding paragraphs can further comprise: wherein to initiate the one or more first authorized modifications includes assigning a first processing core to perform the one or more first authorized modifications, and wherein initiating the one or more second authorized modifications of the data includes assigning a second processing core to perform the one or more second authorized modifications.

The system of any of the preceding paragraphs can further comprise: wherein to initiate the one or more first authorized modifications includes retrieving data files stored external to the area of coverage for the first localized pool of the group of nodes.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Some embodiments utilize blockchain technology, which can be used across various industries, such as recording events, medical records, identity management, transaction processing, documenting provenance, food traceability, and voting. Blockchain technology can use multiple blockchains that are processed by a subset and/or the entire blockchain network. For example, one blockchain can be assigned to a particular location and the localized blockchain can execute development applications for that particular location, whereas another blockchain can verify transactions across all nodes in the blockchain. Blockchain technology can build upon the blockchain network by allowing new applications and functionality using the security and transaction technology of the blockchain.

Traditional blockchain technology can become increasingly slow and impractical where transactions may need to be verified across a large number of computing nodes (sometimes referred to as "nodes"), causing a large delay and requiring large processing power collectively across nodes. The scalability and the ability to process data quickly is becoming one of the biggest issues facing blockchain technology. Delays associated with processing data may open the blockchain to susceptible attacks, such as a node transmitting two conflicting transactions of a blockchain at the same time. If a certain smart contract or development application on a blockchain sees or experiences an increase in traffic due to increase in token usage or smart contract usage, this can slow down the entire blockchain network. Moreover, nodes running on other blockchain networks can have anonymous users who could tamper with or attack the blockchain network in a variety of ways.

Embodiments of this disclosure relate to technical solutions that, by creating a localized blockchain that uses the existing infrastructure of the blockchain, can alleviate the delay and reduce the processing time and/or power requirements for verifying transactions across the entire or substantially entire blockchain. The technical solutions can reduce the overall network throughput to perform certain transactions, such as, modifying data, and/or verifying the digital ledger on the blockchain by creating a localized digital ledger that is specific to a particular location, leading to greater efficiency.

Some embodiments of systems and methods described herein utilize blockchain technology by creating a localized blockchain that performs certain actions (for example, creating a wireless network, offloading a cellular base tower, provide localized file storage, or the like), where nodes can be assigned based on a characteristic of a processor, such as a geolocation of the processor associated with the node. For example, based on the geolocation of the processor, the processor can execute transactions and/or development applications that are specific to a geographical region. As such, the nodes of the localized blockchain can be located close to one another. Verification of transactions for the localized blockchain can occur via communication between nodes that are located close to one another, reducing overall network traffic for the blockchain. Furthermore, the localized blockchain can perform transactions for requests that are specific to the locality of the localized blockchain, reducing processing time and/or power requirements and delay by reducing, for instance, the amount of verifications for the localized blockchain. Because processors located in a specific region can be assigned to a localized blockchain for that particular region, the development applications executing within that region can be used to verify that one or more development applications are executing properly, storing the data properly, and/or writing to the digital ledger correctly.

In some embodiments, the blockchain can include both an overall (sometimes referred to as "global") blockchain and a localized blockchain. Nodes can be assigned to the overall blockchain to perform transactions and/or verifications for the overall blockchain. Nodes can also be assigned to a localized blockchain based on a characteristic of a processor, such as the geolocation of the node.

In some embodiments, a node can be associated with a processor with multiple cores and/or threads. One or more cores can be assigned to the overall blockchain and other cores can be assigned to the localized blockchain. As such, the blockchain can perform global transactions, and/or larger transactions using the overall blockchain, whereas the localized blockchain can perform transactions specific to a particular region, such as store or process data within that region, create a localized wireless network, offload a cellular base tower, localize storage of files, or the like. For example, global blockchain can execute smart contracts, exchange tokens, and process transactions, whereas the localized blockchain can execute high speed data transfers within a geolocation, create wireless connections, and/or the like. Thus, data storage and network throughput can be limited to the region, allowing for faster data retrieval and/or computations, reduced network throughput between the nodes of the region, and faster response times with reduced latency. Moreover, for the global transactions, because a larger subset or all of the nodes would be verifying overall blockchain transactions, the security level may be enhanced for more important transactions. Alternatively, for applications where speed is more important and/or security is less important, the localized blockchain can be implemented by verifying the transactions with a smaller subset of nodes.

Some embodiments of systems and methods described herein improve blockchain technology by providing file sharing services by creating a localized blockchain that allows for local storage of certain files via a localized blockchain ledger. The files can be stored regionally on the localized blockchain (for example, popular movies that are expected to be requested). Such local storage can speed data retrieval when the system expects a high number of requests at a particular time (for example, the release of a popular movie). Localized storage can also be used to reduce overall network usage during busy network times by, for instance, transmitting or moving files during down times.

Some embodiments of systems and methods described herein improve blockchain technology by providing network communication services through creating a localized blockchain that provides network communication via the nodes instead of communicating with wireless communication base stations. In some embodiments, a first node associated with a processor can be assigned a smart contract to enable wireless communication. If a second node requests network communication (such as via a mobile device), the first node can access internet connection via the traditional methods (such as via Ethernet or home WiFi connection) and send and/or receive network traffic on behalf of the second node. In some embodiments, the first node can create a secure network with the second node and the destination address that the second node requests to communicate with. In some embodiments, the first node can create a virtual private network (VPN) for the second node. The first node can receive tokens for facilitating network communication for the second node. As such, the second node can access the network without having to communicate with nearby base stations, reducing the network usage of the base stations and increasing efficiency.

Some embodiments of systems and methods described herein improve network communications technology by creating a localized network that enables alternative communication channels. For example, if a base station is overloaded with requests and/or network traffic, the requesting node can use the localized network of the localized blockchain to communicate with other devices.

Some embodiments of systems and methods described herein improve network communications technology by creating a localized network that enables devices within a region to connect with one another. Devices can connect with other nearby devices using radio frequency signals to create a high-speed wireless internet service.

Unsecured and Secured Network Infrastructure

FIG. 1 is a block diagram illustrating an unsecured and secured network infrastructure according to some embodiments of the present disclosure. The unsecured network 100 of FIG. 1 includes a requestor node 102 and an unsecured network interface 104. The secured network 106 of FIG. 1 includes a first localized pool of secured nodes 110, a second localized pool of secured nodes 114, a secured database 120, and a secured network interface 108. The first localized pool of secured nodes 110 can include a third node 112. The second localized pool of secured nodes 114 can include a first node 116 and a second node 118.

In some embodiments, the network can include an unsecured network 100 and a secured network 106. The unsecured network 100 can include nodes, such as the requestor node 102, that does not have access privileges to data, such as access to modify data in the secured database 120.

The requestor node 102 can request access to the secured network 106. For example, the requestor node 102 can send a request to join a pool via the unsecured network interface 104 that can communicate with a node within the secured network 106 via the secured network interface 108. A node of the secured network, such as the first node 116, the second node 118, or the third node 112, can receive the request from the requestor node 102 and assign the requestor node 102 to a localized pool within the secured network 106, such as the first localized pool 110 or the second localized pool 114 of secured nodes. After the requestor node 102 is assigned to a localized pool within the secured network, the requestor node 102 can be given access and/or modification rights to the secured database 120.

In some embodiments, the requestor node is automatically assigned to a correlating localized pool of secured nodes. A node in the secured network can access a characteristic of the requestor node, such as a characteristic indicative of the location of the requestor node, and assign the requestor node to the localized pool corresponding to that location. For example, if the requestor node 102 is in Phoenix, Ariz., the requestor node 102 can be assigned to a localized pool assigned to Phoenix, Ariz.

Any of the nodes or relays disclosed herein can include a computing device with one or more processors or attached computational devices. The computing device can be one or more of a server, edge computing device, personal computer, tablet, mobile device, or the like.

Network Infrastructure of the Localized Blockchain

Figure 2:
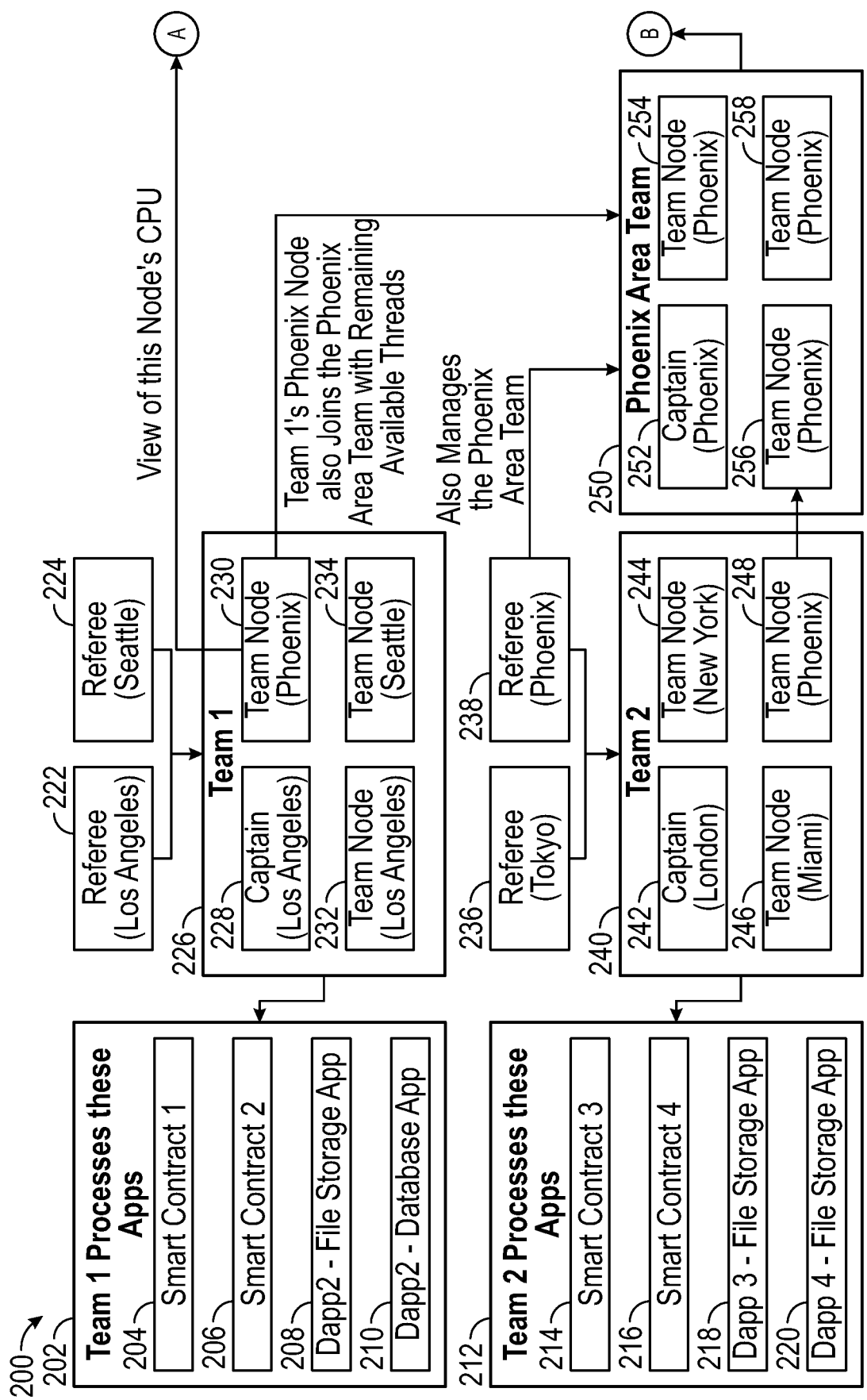
FIG. 2 is a block diagram illustrating a network infrastructure for a localized blockchain according to some embodiments of the present disclosure.
Figure 2:
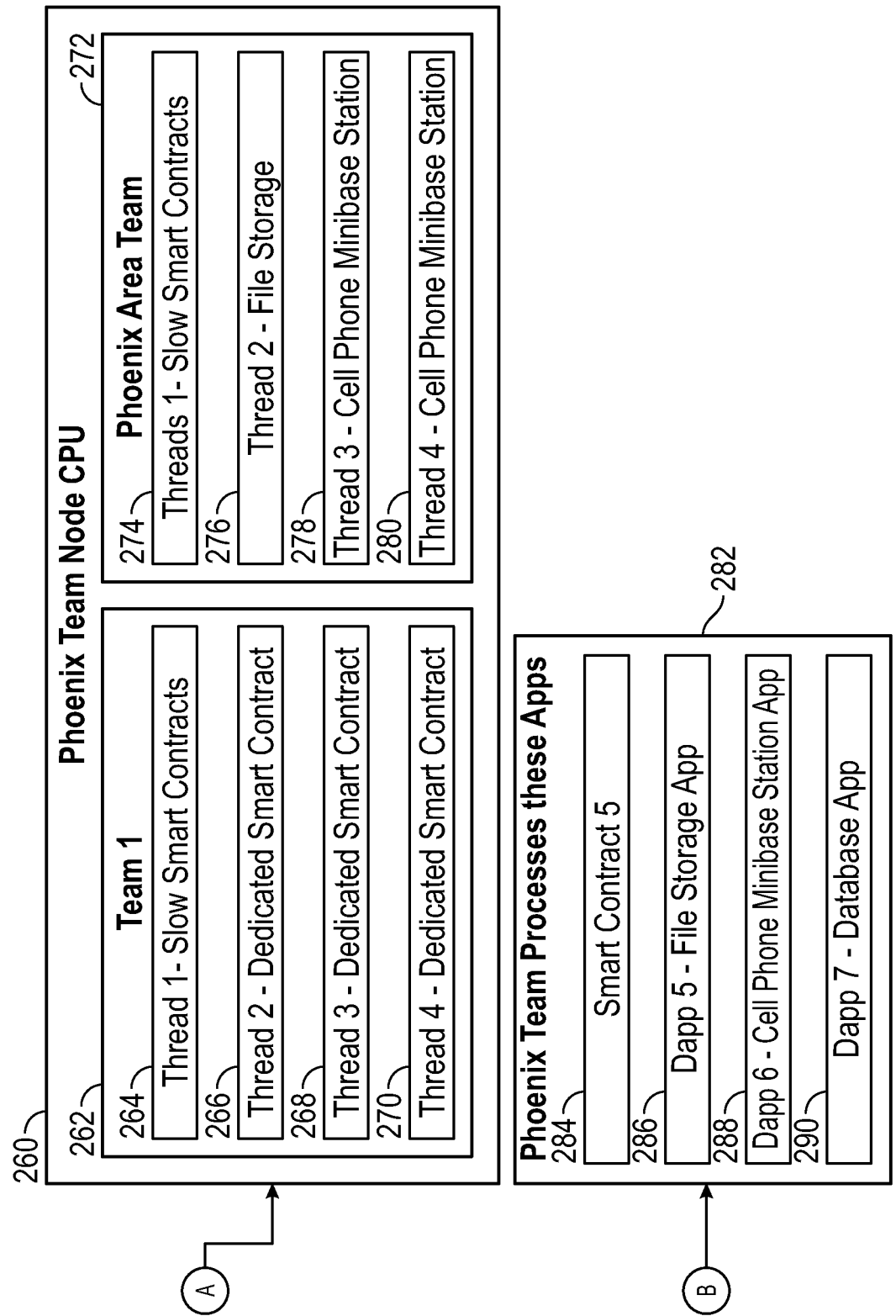

FIG. 2 is a block diagram illustrating a network infrastructure for a localized blockchain according to some embodiments of the present disclosure. As nodes join the network, the nodes can be assigned to referees. The referees can manage nodes assigned to a localized blockchain. For example, a Phoenix referee node 238 can manage activities occurring in the Phoenix Area Team 250, including a captain node 252 and team nodes 254, 256, 258. Referee nodes can also include a Los Angeles referee node 222, a Seattle referee node 224, a Tokyo referee node 236, or the like. If a node located in Phoenix requests to join the blockchain, the Phoenix referee node 238 can communicate with the requestor node to assign the requestor node to the Phoenix Area Team 250.

In some embodiments, a node can be assigned to a plurality of teams. For example, a requestor node can be assigned to the Phoenix Area Team 250 and Team 1 226. Team 1 can include nodes from various locations, such as a Captain node from Los Angeles 228, a team node from Phoenix 230, a team node from Los Angeles 232, and a team node from Seattle 234. Team 2 240 can include a captain node from London 242, a team node from New York 224, a team node from Miami 246, and a team node from Phoenix 248.

In some embodiments, the referee node can manage activities for a particular team (or pool) of nodes. The actions of the referee nodes can include communicating between nodes within the team, facilitating communication with nodes in the team and nodes external to the team, assigning or reassigning nodes to a team, moving nodes to another team, communicating with referee nodes of another team, receive votes for an action on the team and facilitate the action, verify nodes, act as domain name system (DNS) relays, download hash blocks of the blockchain for the team, verify blocks or other types of transactions and computations for the blockchain, enable or disable access to data, distribute objects or coins of the blockchain, determine characteristics of nodes such as location or performance characteristic (such as processing power or latency), repartition nodes on a team to multiple teams, combine teams into a single team, or the like.

In some embodiments, the referee nodes can perform smart contracts or functions of an application, or initiate or facilitate the performance of smart contracts or functions of an application. For example, Team 1 226 can be assigned to perform certain processes 202 such as a smart contract 1 204, a smart contract 2 206, a development application for file storage 208, and a development application for a database application 210. Team 2 240 can be assigned to perform certain processes 212 such as a smart contract 3 214, a smart contract 4 216, a development application for file storage 218, and a development application for a file storage 220. The Phoenix Area Team 250 can be assigned to perform certain processes 282 such as a smart contract 5 284, a development application for file storage 286, a development application for cell phone minibase station 288, and a development application for a database 290.

In some embodiments, the development application 288 performed by the Phoenix Area Team 250 can provide data communication using the cell phone mini base station application. The application on a user's phone can connect to a base station device associated with a team node assigned to the Phoenix Area Team 250. The user's phone can send and receive data packets to and from the device, enabling wireless communication without connecting to a cellular base station. The base station device can enable wireless communication for mobile devices that are in its range.

In some embodiments, the Phoenix Team Node CPU 260 can facilitate the processes to be performed by Team 1 262 and the Phoenix Area Team 272. Team 1 can be assigned to perform slow smart contracts 262 and dedicated smart contracts 266, 268, 270. The Phoenix Area Team 272 can be assigned to perform slow smart contracts 274, file storage 276, and cellphone minibase station applications 278, 280. In some embodiments, a team node can include a team for the global transactions, such a Team 1 262, and a localized blockchain, such as the Phoenix Area Team 272. Team 1 can perform the global transactions using proof of competition, as described in U.S. patent application Ser. No. 16/005,272, filed on Jun. 11, 2018, the entirety of which is incorporated by reference in its entirety.

Architecture for Roles Assigned to Computing Nodes of the Network

Figure 3:
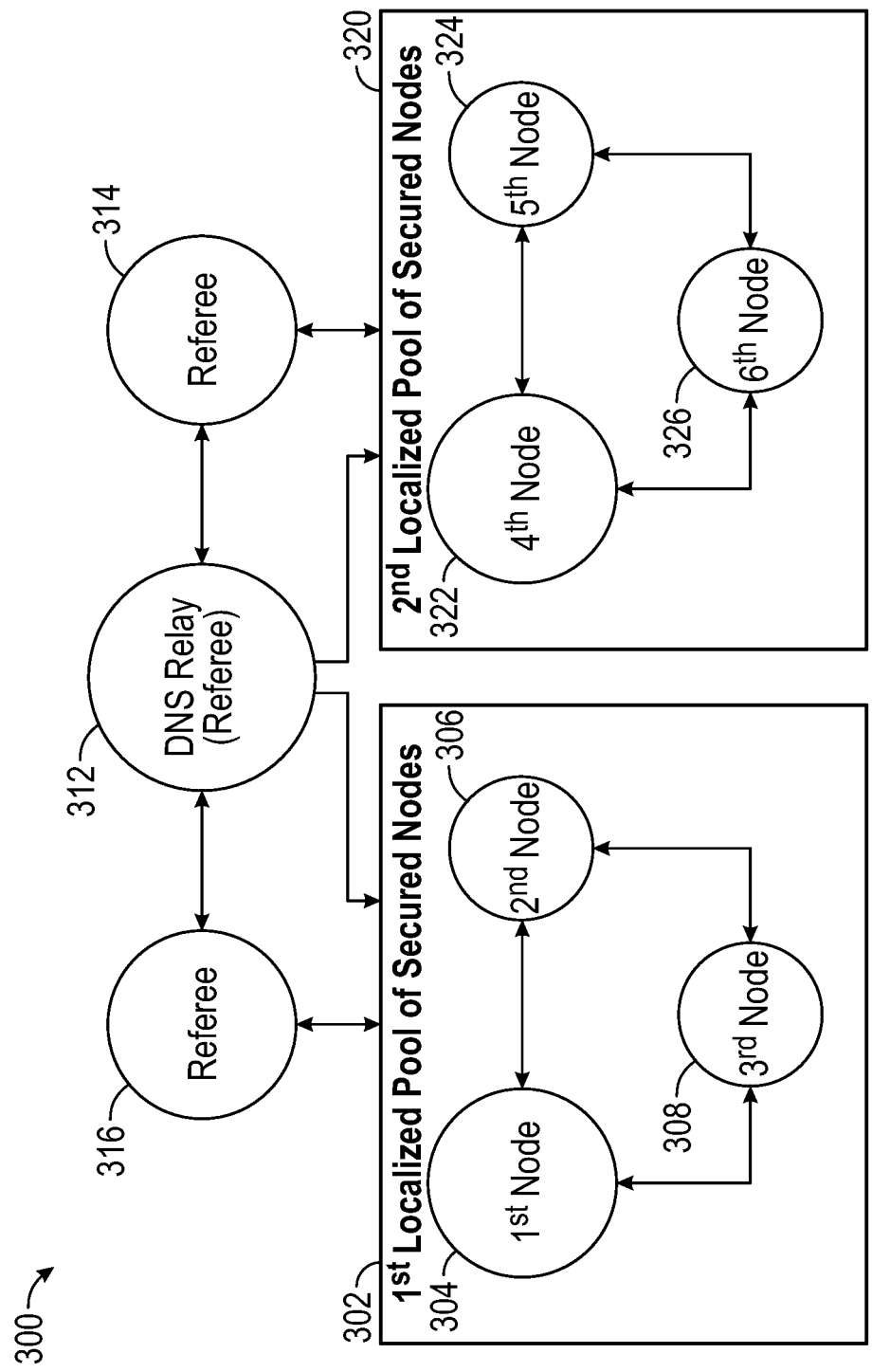
FIG. 3 is a block diagram illustrating system architecture for roles assigned to computing nodes of a network according to some embodiments of the present disclosure.

FIG. 3 is a block diagram illustrating system architecture for roles assigned to computing nodes of a network according to some embodiments of the present disclosure. The system architecture 300 can include a referee node 316 for the $1^{st}$ localized pool of secured nodes 302, a referee node 314 for Team 2 320, a domain name system ("DNS") relay 312 (which can also be a referee node), $1^{st}$ localized pool of secured nodes 302, and $2^{nd}$ localized pool of secured nodes 320. $1^{st}$ localized pool of secured nodes 302 can include a $1^{st}$ node 304, a $2^{nd}$ node 306, and a $3^{rd}$ node 308. The $2^{nd}$ localized pool of secured nodes 320 can include a 4th 322, a $5^{th}$ Team 2 node 324, and a $6^{th}$ 2 node 326. In some embodiments, the referee nodes 314 and 316 can be external to a team or assigned to a team.

In some embodiments, the network is partitioned into a plurality of localized teams, such as $1^{st}$ localized pool of secured nodes 302 and $2^{nd}$ localized pool of secured nodes 320. The teams can be scalable or the size of the teams can vary.

The teams, such as teams 302, 320, can be managed by referee nodes, such as referee nodes 316, 314, respectively. For example, for every 25 nodes on a team, a referee can be assigned to manage the 25 nodes. In some embodiments, a team can be managed by one or more referee nodes. In some embodiments, referee nodes can be assigned based on geography, such as political geography.

The referee nodes 316, 314 can keep track of the number of nodes on each team or the assigned team. The referee nodes 316, 314 can keep track of the geolocations of the nodes on each team or the assigned team. The referee nodes 316, 314 can assign new nodes or remove existing nodes on a team, such as depending on the needs of the team. The referee nodes 316, 314 can manage the data processed by the team nodes assigned to the team that the referee nodes 316, 314 manages, such as ensuring that the data processed by each team node is correct or lock smart contracts that may indicate malicious behavior by a network-selected cyber security organization.

The team nodes, such as the 1st node 304 can request to perform computations of the network by connecting to a referee node, such as the referee node 316. The team nodes can process data, transactions, smart contracts, or the like.

In some embodiments, the best performing node of a team can be assigned to be a captain node. The captain node can generate the block hash or perform computations of the team nodes. The captain node can place a request for computation or verification of the blockchain on a merkle tree or other list that includes objects or hashes that describe actions occurred within the block. Captain nodes can create new blocks for the blockchain. The captain node or other node can determine whether the requested action can be placed on the merkle tree. The referee or the captain node can relay the request to other nodes of the team, and the other nodes of the team can build the merkle tree according to the request received from the referee or captain node The DNS relay 312 can direct incoming traffic to a particular team node or receive requests from a requestor node to join a team. In some embodiments, the DNS relay 312 can be assigned as a referee node. The DNS relay 312 can direct traffic to a team's captain that has the smart contract or ledge the client may be looking for. The referee nodes 314, 316 can redirect the traffic to another node, such as a team node, to execute the smart contract or ledge. In some embodiments, if the DNS relay 312 is the originating node for the request, the request can be redirected to another node.

Figure 4:
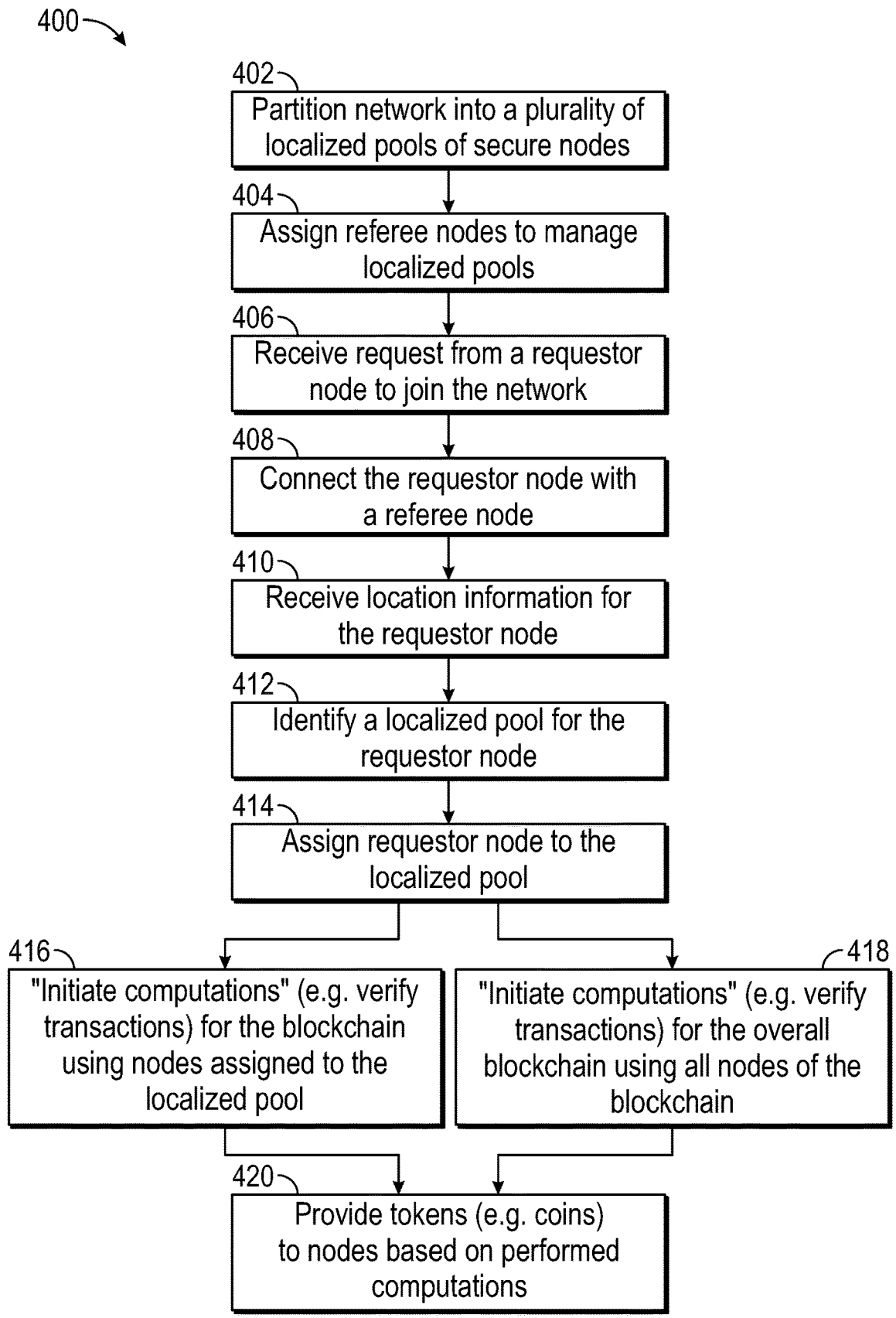
FIG. 4 is a flow chart illustrating a process for performing blockchain computations on a localized team and on an overall team according to some embodiments of the present disclosure.

Performance of Blockchain Computations on the Localized Team and the Overall Team FIG. 4 is a flow chart illustrating a process 400 for performing blockchain computations on a localized team and on an overall team according to some embodiments of the present disclosure. The process 400 can be implemented by a referee node or other node of the team in the network.

The process 400 begins in block 402, where the network is partitioned into teams (such as pools of nodes). In the example of FIG. 4, the team can include localized pools, such as partitioned based on geographical location.

In block 404, the teams can be assigned a referee node to manage nodes on the teams. In some embodiments, a referee node can be assigned based on a vote. For example, nodes on the team can vote for the referee node to manage activities on the node. Assignment of a node can be based on certain circumstances, such as ability to route traffic, processing power and speed, availability, or the like. In some embodiments, nodes of the team can vote out a referee. In some embodiments, certain nodes, such as verified nodes, can outvote the collective vote of all nodes of the team or have different weightings associated to their vote.

In block 406, a node on a team or a referee node can receive a request from a requestor node to compete on the network. In some embodiments, a requestor node can be required to perform a background screening process, request a background screening process, or provide results of a background screening process. For example, the requestor node can contact a selected background screening service, and receive verification of the background screening. The background screening service can include verification of residence for the user, data related to convicted crimes, verification from other nodes, such as from other verified nodes, or the like. If a node provides verification and the verification becomes compromised, the blockchain, such as a referee node, can discard of the compromised verification or generate new verification. In some embodiments, a request for verification or submission of the verification may require a payment of blockchain tokens for the referee node or other node generating the verification. In some embodiments, some or all nodes of a team are required to be verified to join the team.

In block 408, the requestor node can be connected with a referee node. The referee node can help manage the network and ensure the network is performing fairly. The referee node can facilitate the creation of new teams, route network traffic, and assign/reassign nodes to a node. Referee nodes can be controlled by an input of a user or automatically. Referees can be selected by the network via voting or reassigned via voting. Referee nodes can become DNS relays.

In block 410, the referee node can receive location information for the requestor node. The location information can be obtained by assessing a node's IP address, a base tower address, a received physical address, or the like. Further factors are described in FIG. 5.

In block 412, the referee node can identify a corresponding localized pool for the requestor node. For example, a physical address can be obtained for the requestor node. The referee node can identify the state and country that the physical address includes. The referee node can then identify a localized pool of nodes corresponding to the state and country.

In block 414, the requestor node can be assigned to the corresponding localized team In block 416, the nodes of the localized pool can perform computations particular to the localized pool. The transactions can include an action to be performed for an account holder located in the geolocation corresponding to the localized pool. For example, the account holder can request a message using a private key detailing the action the account holder would like to perform in the location corresponding to the localized pool. The request for action can be sent to a team's referee node associated with the account.

In block 418, all nodes of the blockchain or a subset of the nodes of the blockchain that are not assigned based on location can perform computations or verifications for the blockchain. For example, a team can be assigned based on computational processing power. For the team including nodes with high computational processing power, verifications or transactions that require higher computational processing power can be assigned to this team.

While the action is being confirmed by the nodes of the team, the account can be locked or cannot send any more requests for transactions or actions until the nodes of the team verify the transaction or action. Once the nodes of the team verify or process the transaction or action, the account can be unlocked.

In some embodiments, the transaction can include transferring tokens, such as objects or coins of the blockchain, to another account. The transaction can be to subtract an amount of tokens from one account and add the amount of tokens to another account. The ledger can indicate that the tokens were subtracted from one account and added to another account.

The ledger can include an option where tokens are immediately removed from the sending account, then sent in portions at a later time. Multiple hashes that represent the portion transactions can be requested at later varying times. Advantageously, the transaction can include an additional layer of transactional anonymity.

Nodes on a team can keep track of the total number of tokens currently on the network or assigned to the team. As coins are subtracted and added based on each transaction, the total coin for the network or for each team can be updated. Referee nodes can continually share the latest coin count changes amongst each other, or pass these changes to other nodes.

An account can include a token wallet. An account can be created by a node or processor using an input from a user. In some embodiments, users trying to create the account can be requested or required to verify a series of transactions and blocks, or pay to create an account, such as in the amount of tokens. The token payment can be distributed to nodes within the team or pools within the team. Accounts can be assigned to a particular team and not to the entire network. Accounts can hold an amount of tokens or be able to transfer tokens to other accounts on the same or different teams. Each account can be associated with a public key and a private key. Accounts can include an email with the username, a team name, or a token symbol. For example, an account address can be: nathan@team10.xrj.

An example format can be:
[Account name]@team[number].[token symbol]

Tokens or objects of the blockchain can be sent or received from the wallet. For example, game objects or real estate objects can be transferred from one person to another. An example of a real estate transfer can be: nathan@team10.object->house. Advantageously, objects can be securely transferred via a smart contract or a development application securely.

An example format can be:
[Account name]@team[number].object->[object symbol]

A url encoded query string can be appended to the end of the account as the transaction destination. Two examples of such a URL encoded query string can be:
nathan@team10.object->house?id=19&name=Cool+house
nathan@team10.xrj?message=Hi+there+guy In block 420, nodes can be provided tokens, such as blockchain coins, based on the performed computations performed for the localized pool or the overall blockchain.

In some embodiments, the blockchain network or a particular team can generate a certain number of tokens per time interval. For example, 1.65 tokens can be generated per hour. If there are 200 teams with 100 nodes and 4 referees for each team, approximately 2,890,800 tokens can be generated per year.

Figure 5:
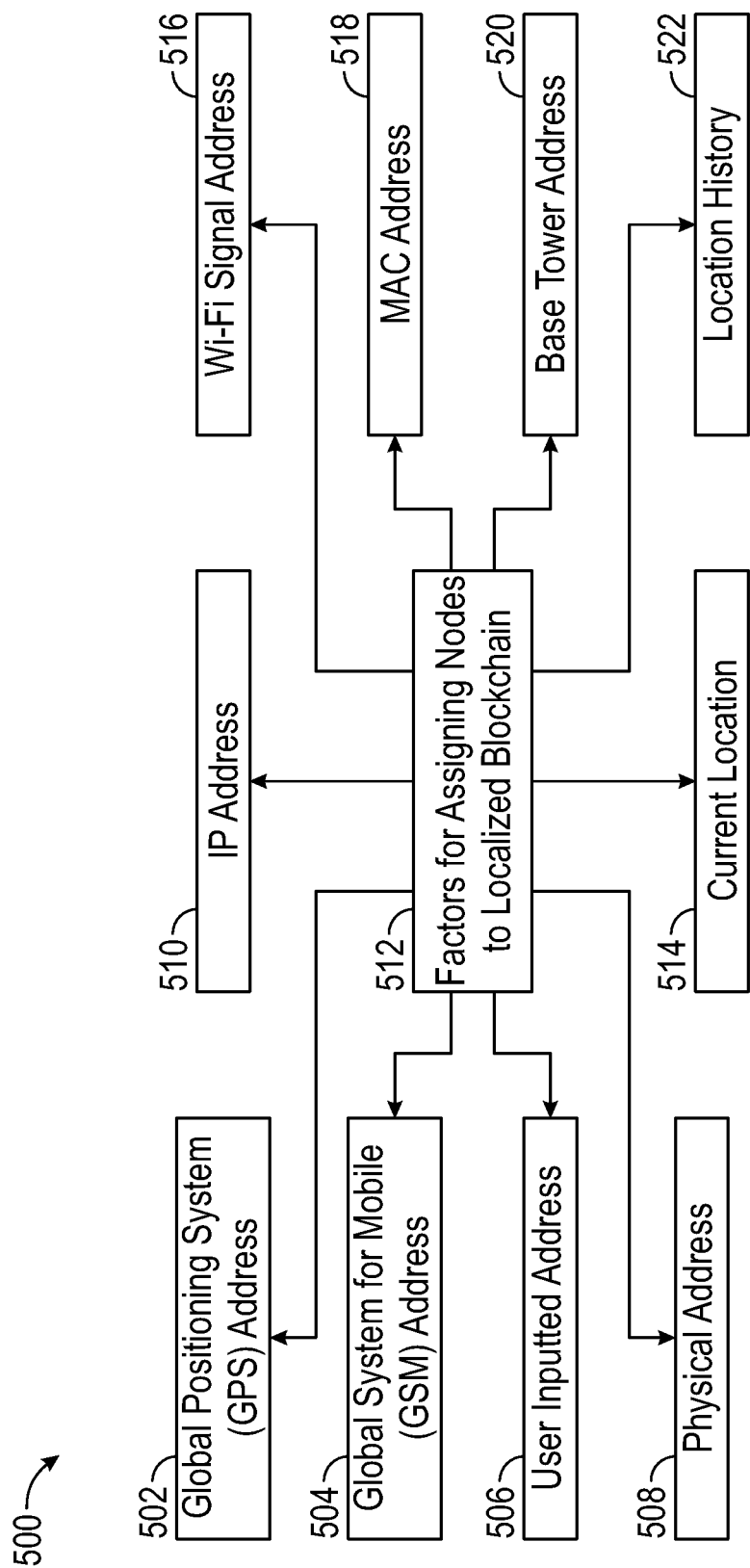
FIG. 5 is a block diagram illustrating factors for assigning nodes to localized teams of the blockchain according to some embodiments of the present disclosure.

An non-limiting example of a mining payout can include:
0.1 Tokens to the Captain
0.5 Tokens split between each node on the team
0.1 Tokens to the developers
0.1 Tokens to each DNS relay on the team
0.05 Tokens to a pool for DDOS protection services
0.1 Tokens to a pool for bug bounties and security vulnerabilities
0.1 Tokens to a pool for the network's legal representatives
0.1 Tokens split evenly amongst the background screening providers
0.1 Tokens split evenly amongst the cyber security organizations
0.1 Tokens to each referee on the team to help maintain the network The tokens created on the network can remain only on that team. The symbol associated with the token can be distributed among the referee nodes, such that traffic can be routed between teams. Token symbols and object symbols can be reserved for a fee of a certain number of tokens per time period, such as 0.01 tokens per year. Tokens can be used on run transactions on the network, such as 0.00001 tokens per hour. For every certain number of transactions per hour, the token fee can include a multiplier. For example:
Hour 1: 30,000 tx/h—0.00001 tokens/h
Hour 2: 40,000 tx/h—0.00002 tokens/h
Hour 3: 40,000 tx/h—0.00002 tokens/h
Hour 4: 70,000 tx/h—0.00002 tokens/h
Hour 5: 80,000 tx/h—0.00003 tokens/h
Hour 6: 90,000 tx/h—0.00003 tokens/h
Hour 7: 120,000 tx/h—0.00004 tokens/h Factors for Assigning Nodes to Localized Teams of the Blockchain FIG. 5 is a block diagram 500 illustrating factors for assigning nodes to localized teams of the blockchain according to some embodiments of the present disclosure. The factors 512 can be retrieved by a referee node of the localized team to determine whether the localized team is the correct team for the node.

The factors 512 can include a global positioning system (GPS) address 502, a global system for mobile (GSM) address 504, a user inputted address 506, a physical address 508, an IP address 510, a current location 514, a Wi-Fi signal address 516, a MAC address 518, a base tower address 520, a location history 522, or the like. The nodes can report their geolocation using longitude and latitude of the blockchain itself, and the blockchain can organize the nodes accordingly.

Figure 6:
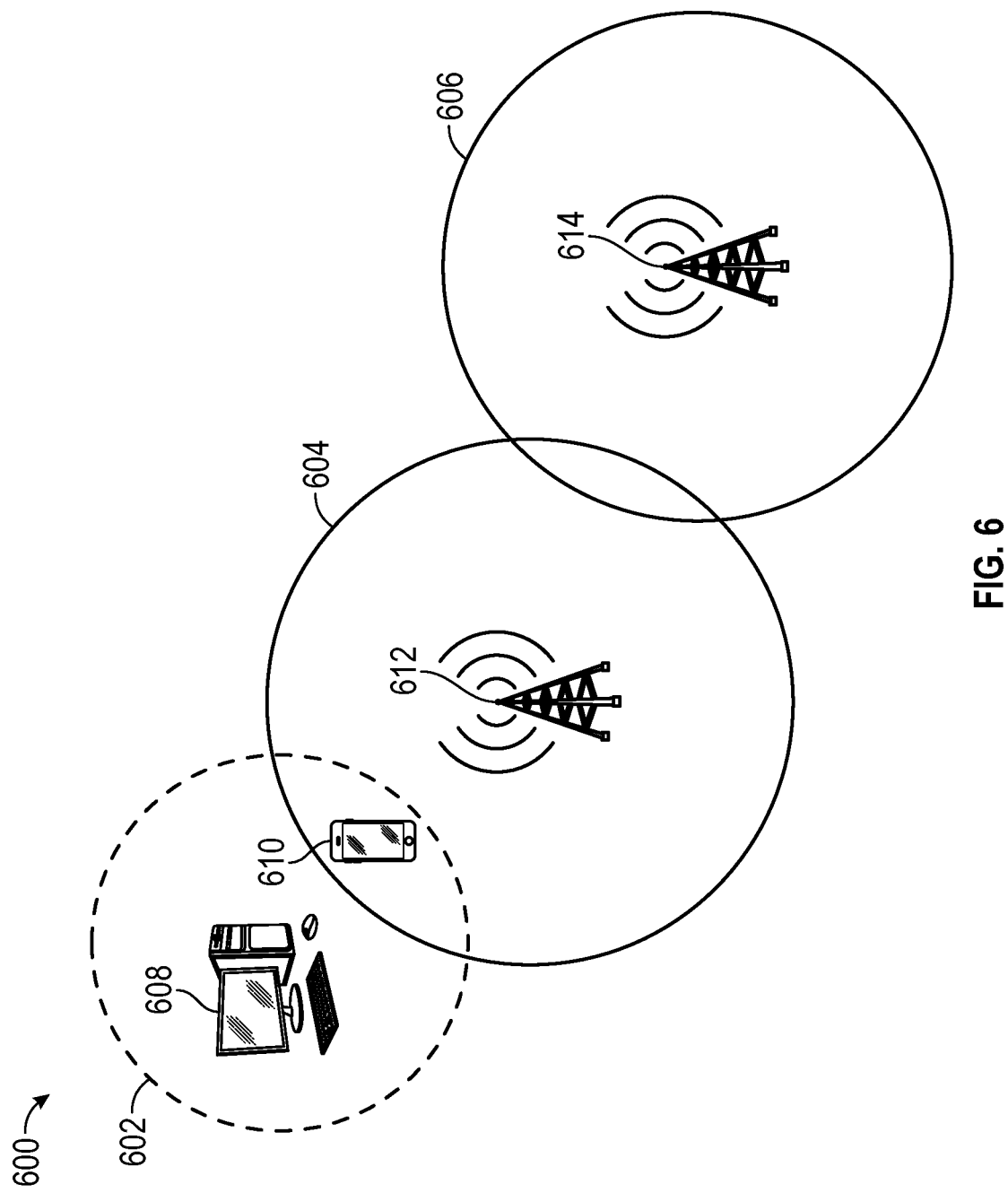
FIG. 6 is a diagram illustrating a mini base station application for wireless communication according to some embodiments of the present disclosure.

FIG. 6 is a diagram 600 illustrating a mini base station application for wireless communication according to some embodiments of the present disclosure. A remote device 610, such as a mobile phone of user can be connected to various cellphone base stations 612, 614.

The remote device 610 connects to the cellphone base stations 612, 614 to send and receive data packets for wireless communication. However, there are times when the base stations 612, 614 do not have sufficient bandwidth to provide the remote device 610 a fast connection. Moreover, signals to and from base stations 612, 614 may be limited based on a certain distance 604, 606 from the base station, and the signal strength may deteriorate as the remote device 610 moves further away from the base stations 612, 614. Furthermore, other means of communications, such as Wi-Fi or Ethernet, can be much faster than sending and receiving signals to and from a base station 612, 614.

Nodes of a blockchain can be tied to communication systems 608 that enable sending and receiving of data packets to a remote device 610 in a certain area 602. The localized blockchain can include a subset of the nodes of the blockchain. Thus, data packets sent to and from the remote device 610 and the communication system 608 can be verified by the subset of nodes on the localized team. Advantageously, the verification can occur very quickly (thus providing high speed communication) by verifying the data transaction among a subset of nodes, and not to all nodes of the blockchain. Moreover, nodes that are not assigned to the localized team do not have to verify the data packets sent to and from the remote device 610, reducing overall processing power requirements of the blockchain. Furthermore, because the verification is occurring on a subset of nodes, the process is less reliant on network conditions, such as network delay, packet loss, or jitter, providing one of the practical applications of technological improvements for node processing.

As an illustration, the remote device 610 can be in Phoenix, Ariz. The remote device 610 can connect with a node on the Phoenix Area Team via the communication system 602. The communication system 602 can send and receive data packets to the remote device 610 using a Wi-Fi connection, and can connect to the Internet via ethernet. Accordingly, the remote device 610 can access high speed internet without the use of a cellular base station.

In some embodiments, if a base station 612 is overloaded, the base station 612 can request the communication system 608 to help reduce the load of the base station 612 and the base station 612 can reroute the traffic to the communication system 608. Advantageously, the base station 612 can automatically and dynamically handle more throughput than the base station 612 can handle alone, providing for improved communications for the remote device 610.

Figure 7:
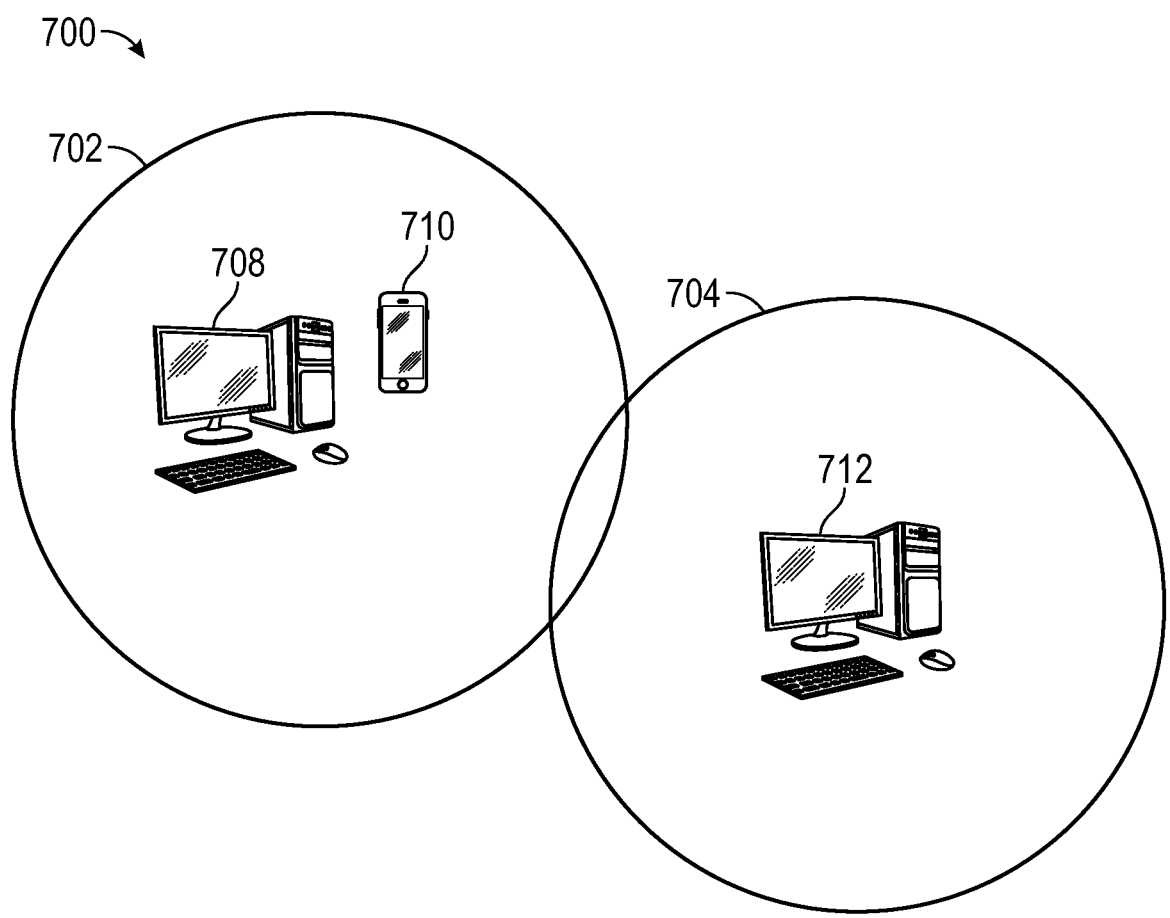
FIG. 7 is a diagram illustrating a high speed wireless communication network according to some embodiments of the present disclosure.

FIG. 7 is a diagram 700 illustrating a high speed wireless communication network according to some embodiments of the present disclosure. A remote device 710, such as a mobile phone of user can be connected to communication systems 708, 812. The communication systems 708, 712 can be tied to nodes of a localized team of a blockchain. The communication systems 708, 712 can create a high speed wireless communication network with coverage over the areas 702, 704. With enough communication systems 708, 712, the area corresponding to the localized team can be covered with a high speed wireless communication. In some embodiments, an internet service provider can create a connection to nodes via higher speed connections, such as a high speed fiber optic cable. The internet service provider can provide a wireless device to some or all localized blockchain nodes in order to connect the nodes in one or more networks. Since the nodes of the localized blockchain can be assigned to a localized team, the nodes of the localized blockchain can execute the same transactions and/or development applications and verify that the executions have been performed correctly. In some embodiments, another internet service provider can offer the same or different wireless device that connects some or all nodes of the localized blockchain on the same team. Customers that connect to the localized wireless network can connect to the wireless device and share the internet connection of the one or more nodes connected to the wireless device. The wireless device can be connected to the localized node and, for example, in case of the localized node being a mobile device, can offload network traffic that runs through a base station via which the localized node would otherwise send and receive data. In some embodiments, the wireless device could perform functionality of a base station and route traffic through the node's internet connection over a secure connection to the cellular provider. Advantageously, the secure connection can provide an additional layer of information security that would not otherwise be available on a user's mobile device.

In some embodiments, the localized team verifies the remote device 710 using the blockchain and thereafter enables access to the communication systems 708, 712 for use of the high speed wireless communication network. For example, after verification of the remote device 710, the remote device is provided an access protocol to access the high speed data. In certain embodiments, the localized team verifies the data packets, or a subset thereof, going to or from the remote device 710 and the communication systems 708, 712.

In some embodiments, the remote device 710 can distribute tokens or coins to the communication system 708, 712 for use of the high speed communication network. The tokens can be distributed based on the log-in, number or size of data packets, length of time connected to the high-speed network, or the like.

Figure 8:
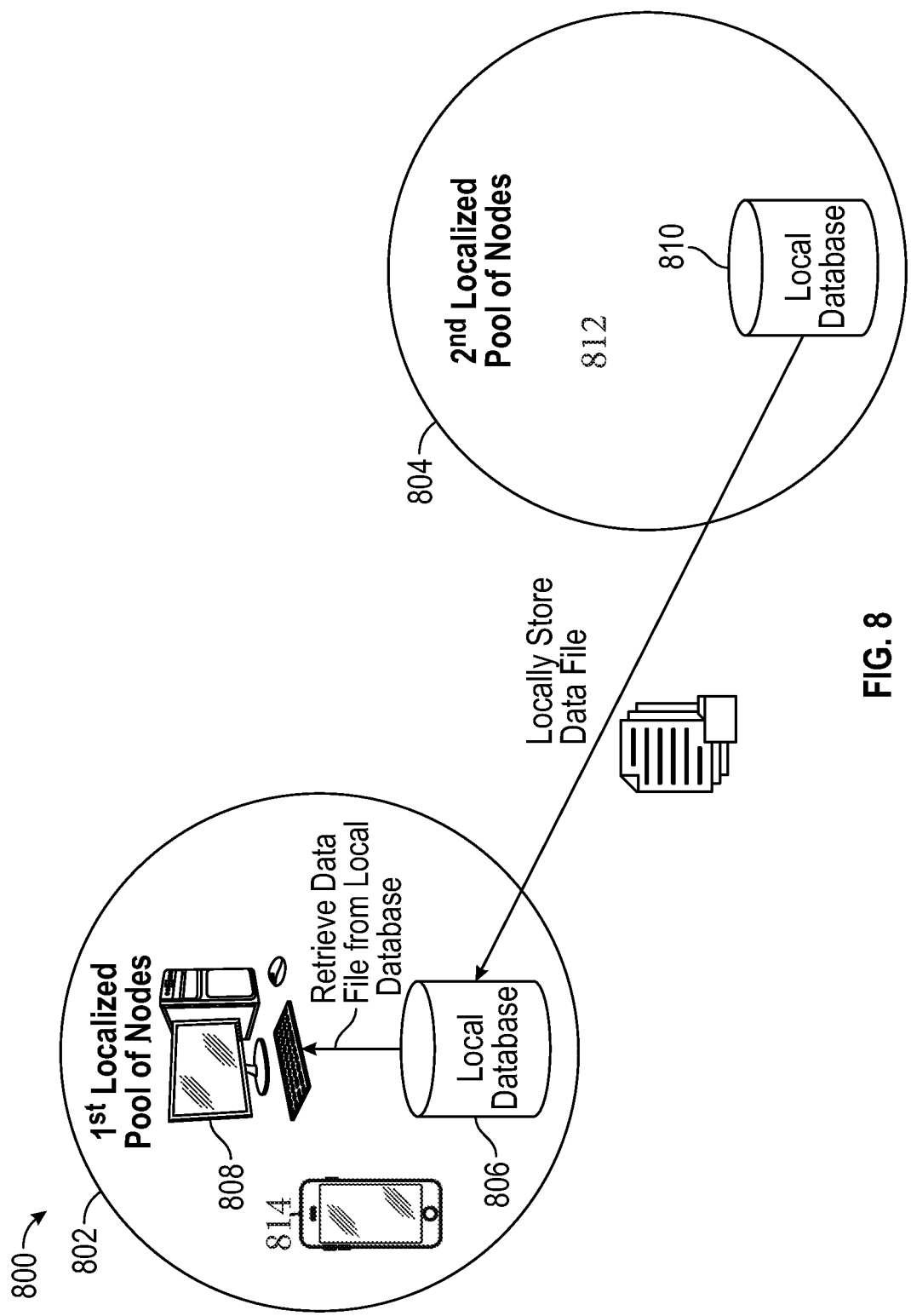
FIG. 8 is a diagram illustrating localized file storage via the localized team according to some embodiments of the present disclosure.

FIG. 8 is a diagram 800 illustrating localized file storage via the localized team according to some embodiments of the present disclosure. The diagram 800 includes a first localized pool of nodes 802 and a second localized pool of nodes 810.

The second localized pool of nodes 810 can include a local database 810 that stores data files and a communication system 812 that communicates with the local database 810. A locally stored data file can be transferred to a local database 806 of the first localized pool of nodes 802. The first localized pool of nodes 802 can include a communication system 808 that facilitates the transfer of the data file with the communication system 812 of the second localized pool of nodes.

A remote device 814 can request the data file from the first localized pool of nodes 802. The remote device 814 can be in a geolocation corresponding to the first localized pool of nodes 802. Thus, the transfer of the locally stored data file can occur quickly via the blockchain because a subset of the nodes assigned to the first localized pool of nodes 802 can verify the transaction. Furthermore, another advantage is the speed of transfer by retrieving the file from a database that is geographically close to the remote device 814 that is requesting the data file. Advantageously, a data file that is expected to be requested or a highly requested data file can be stored locally across the world.

Other Variations

Those skilled in the art will appreciate that in some embodiments additional system components can be utilized, and disclosed system components can be combined or omitted. Although some embodiments describe video data transmission, disclosed systems and methods can be used for transmission of any type of data. In addition, although some embodiments utilize erasure coding, any suitable error correction schemes can be used. The actual steps taken in the disclosed processes, such as the processes illustrated in FIGS. 2A-2C, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the various components illustrated in the figures may be implemented as software or firmware on a processor, ASIC/FPGA, or dedicated hardware having one or more logic circuits. Also, the features and attributes of the specific embodiments disclosed above may be combined in different ways to form additional embodiments, all of which fall within the scope of the present disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will further be understood that the terms "comprises" or "comprising," when used in this specification, specify the presence of stated features, integers, steps, operations, elements, or components, but do not preclude the presence or addition of one or more other features, integers, steps, operations, elements, components, or groups thereof. Further, references to "a method" or "an embodiment" throughout are not intended to mean the same method or same embodiment, unless the context clearly indicates otherwise.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The corresponding structures, materials, acts, and equivalents of all means or step plus function elements in the claims below are intended to include any structure, material, or act for performing the function in combination with other claimed elements as specifically claimed. The description of the various embodiments of the present disclosure has been presented for purposes of illustration and description, but is not intended to be exhaustive or limited to the embodiments disclosed. Many modifications and variations will be apparent to those of ordinary skill in the art without departing from the scope and spirit of this disclosure. The example embodiments were chosen and described in order to best explain the principles of this disclosure and the practical application, and to enable others of ordinary skill in the art to understand this disclosure for various embodiments with various modifications as are suited to the particular use contemplated.

Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data access control method comprising:
   by at least one processor of a first node:
   via a network interface, receiving a request packet from a requestor node on an unsecured network to join a group of nodes in a secured network, the first node configured to monitor data shared in the group of nodes comprising a plurality of partitioned nodes of the secured network;
   in response to the received request packet, receiving location information associated with the requestor node;
   determining that a location of the requestor node is within an area of coverage for a first localized pool of the group of nodes within the secured network based on the received location information associated with the requestor node;
   assigning, using a secured network protocol through the network interface, the requestor node to the first localized pool, wherein one or more nodes of the first localized pool are configured to perform one or more authorized modifications of data, the data comprising a blockchain including at least one cryptographic hash configured to protect the data against unauthorized modifications;
   initiating one or more first authorized modifications of a first subset of the data using one or more nodes assigned to the first localized pool including the requestor node; and
   initiating one or more second authorized modifications of a second subset of the data using one or more nodes assigned to the first localized pool including the requestor node and one or more nodes of a second localized pool of the group of nodes, wherein the one or more nodes of the second localized pool are different than the one or more nodes of the first localized pool,
   wherein the one or more first authorized modifications comprise transmitting data packets between the first node and a remote device, wherein the one or more first authorized modifications occur in response to meeting a threshold of network traffic for a cellular base station in communication with the remote device.

2. The data access control method of claim 1, wherein the method further comprises:
   partitioning nodes of the secured network into a plurality of localized pools of secured nodes based on location information, the plurality of localized pools of secured nodes including the first and second localized pool.

3. The data access control method of claim 1, wherein the one or more first authorized modifications comprise modifying data located in the location corresponding to the location information.

4. The data access control method of claim 1, wherein the one or more first authorized modifications occur in response to signal from the cellular base station, and wherein the one or more first authorized modifications include disconnecting the remote device from the cellular base station.

5. The data access control method of claim 1, wherein the location information includes at least one of: global positioning system address, global system for mobile address, user inputted address, physical address, IP address, Wi-Fi signal address, MAC address, base tower address, location history, or a current location for the first node.

6. The data access control method of claim 1, wherein initiating the one or more first authorized modifications includes assigning a first processing core to perform the one or more first authorized modifications, and wherein initiating the one or more second authorized modifications of the data includes assigning a second processing core to perform the one or more second authorized modifications.

7. The data access control method of claim 1, wherein initiating the one or more first authorized modifications includes retrieving data files stored external to the area of coverage for the first localized pool of the group of nodes.

8. The data access control method of claim 1, wherein initiating the one or more first authorized modifications includes transmitting and receiving network traffic on behalf of a remote device.

9. The data access control method of claim 1, wherein initiating the one or more first authorized modifications includes creating a wireless internet service for a remote device located in the area of coverage for the first localized pool of the group of nodes.

10. A data access control system comprising:
a network interface of a first node; and
at least one processor of the first node configured to:
via the network interface, receive a request packet from a requestor node on an unsecured network to join a group of nodes in a secured network, the first node configured to monitor data shared in the group of nodes comprising a plurality of partitioned nodes of the secured network;
in response to the received request packet, receive location information associated with the requestor node;
determine that a location of the requestor node is within an area of coverage for a first localized pool of the group of nodes within the secured network based on the received location information associated with the requestor node;
assign, using a secured network protocol through the network interface, the requestor node to the first localized pool, wherein one or more nodes of the first localized pool are configured to perform one or more authorized modifications of data, the data comprising a blockchain including at least one cryptographic hash configured to protect the data against unauthorized modifications;
initiate one or more first authorized modifications of a first subset of the data using one or more nodes assigned to the first localized pool including the requestor node; and
initiate one or more second authorized modifications of a second subset of the data using one or more nodes assigned to the first localized pool including the requestor node and one or more nodes of a second localized pool of the group of nodes, wherein the one or more nodes of the second localized pool are different than the one or more nodes of the first localized pool, wherein initiating the one or more first authorized modifications includes retrieving data files stored external to the area of coverage for the first localized pool of the group of nodes.

11. The data access control system of claim 10, wherein the at least one processor is further configured to:
partition nodes of the secured network into a plurality of localized pools of secured nodes based on location information, the plurality of localized pools of secured nodes including the first and second localized pool.

12. The data access control system of claim 10, wherein the one or more first authorized modifications comprise modifying data located in the location corresponding to the location information.

13. The data access control system of claim 10, wherein the one or more first authorized modifications comprise transmitting data packets between the first node and a remote device.

14. The data access control system of claim 10, wherein the one or more first authorized modifications occur in response to signal from a cellular base station in communication with a remote device, and wherein the one or more first authorized modifications include disconnecting the remote device from the cellular base station.

15. The data access control system of claim 14, wherein the one or more first authorized modifications occur in response to meeting a threshold of network traffic for the cellular base station.

16. The data access control system of claim 10, wherein the location information includes at least one of: global positioning system address, global system for mobile address, user inputted address, physical address, IP address, Wi-Fi signal address, MAC address, base tower address, location history, or a current location for the first node.

17. The data access control system of claim 10, wherein initiating the one or more first authorized modifications includes assigning a first processing core to perform the one or more first authorized modifications, and wherein initiating the one or more second authorized modifications of the data includes assigning a second processing core to perform the one or more second authorized modifications.

* * * * *